United States Patent [19]

Shinohara et al.

[11] 3,720,716

[45] March 13, 1973

[54] PROCESS FOR PREPARATION OF CRESOL AND ACETONE FROM CYMENE HYDROPEROXIDE

[75] Inventors: Yoshiyuki Shinohara, Otake; Toshiyuki Isaka, Iwakuni, both of Japan

[73] Assignee: Mitsui Petrochemical Industries, Ltd., Tokyo, Japan

[22] Filed: June 12, 1970

[21] Appl. No.: 45,641

[52] U.S. Cl..............................260/593 A, 260/610 B
[51] Int. Cl................................................C07c 49/08
[58] Field of Search.....................................260/593 A

[56] References Cited

UNITED STATES PATENTS

| | | | |
|---|---|---|---|
| 2,750,424 | 6/1956 | Armstrong et al. | 260/593 A |
| 2,881,222 | 4/1959 | Joris et al. | 260/593 A |
| 2,906,676 | 9/1959 | Bewley et al. | 260/593 A |
| 2,957,921 | 10/1960 | Adams et al. | 260/593 A |

*Primary Examiner*—Daniel D. Horwitz
*Attorney*—Sherman and Shalloway

[57] ABSTRACT

An improvement for a process for the preparation of cresol and acetone from cymene hydroperoxide which comprises (a) subjecting a liquid oxidation product of cymene containing at least 50 percent by weight of cymene hydroperoxide to an acid-catalyzed cleavage at a temperature of 60°– 90°C. until the concentration of cymene hydroperoxide in the liquid is 0.5 – 5 percent by weight, (b) neutralizing the incompletely cleaved product with an alkali to stop the acid-catalyzed cleavage, (c) thermally decomposing the hydroperoxide remaining in the oil phase of the neutralized product at a temperature of 100°– 250°C. and (d) recovering cresol and acetone from the thermal decomposition product.

8 Claims, 1 Drawing Figure

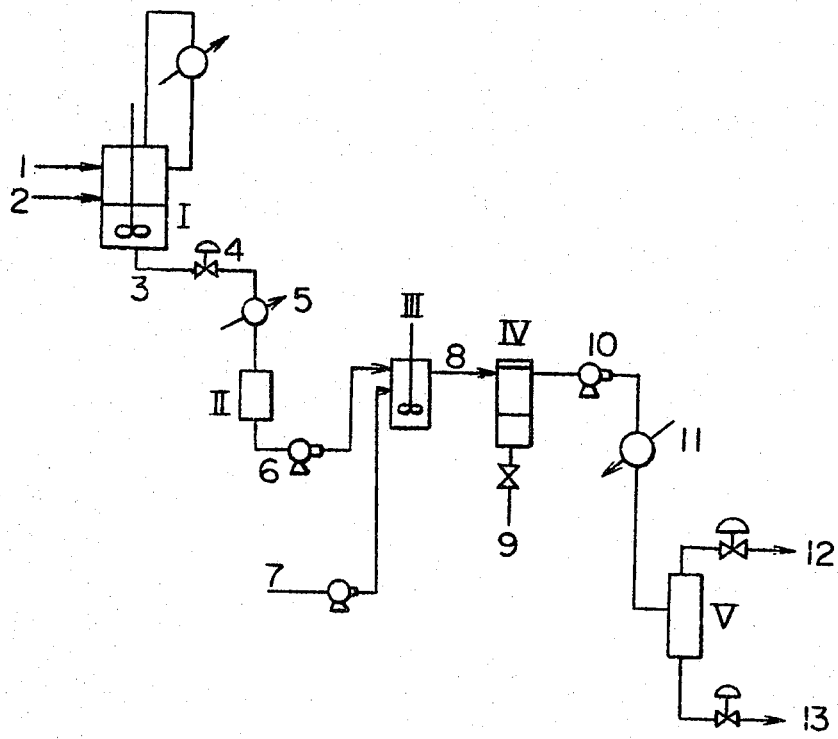

PROCESS FOR PREPARATION OF CRESOL AND ACETONE FROM CYMENE HYDROPEROXIDE

This invention relates to a process for preparing cresol and acetone from cymene hydroperoxide, with industrial advantages. More specifically, this invention relates to a process for the preparation of cresol and acetone from cymene hydroperoxide which comprises (a) subjecting a liquid oxidation product of cymene containing at least 50 percent by weight of cymene hydroperoxide to an acid-catalyzed cleavage at a temperature of 60° – 90°C. until the concentration of cymene hydroperoxide in the liquid is 0.5 – 5 percent by weight, preferably 0.5 – 3 percent by weight, (b) neutralizing the incompletely cleaved product with an alkali to stop the acid-catalyzed cleavage, (c) thermally decomposing the hydroperoxides remaining in the oil phase of the neutralized product at a temperature of 100° – 250°C. and (d) recovering cresol and acetone from the thermal decomposition product.

A known method for preparing phenol and acetone from a liquid oxidation product of cumene comprises subjecting an α,α-dialkylarylmethyl hydroperoxide, particularly cumene hydroperoxide, to an acid-catalyzed cleavage, neutralizing the resulting cleaved product with an alkali and recovering phenol as corresponding phenolic compound and acetone as corresponding aliphatic ketone from the neutralized product.

In accordance with this known method, a liquid oxidation product obtained by the oxidation of cumene expressed by the following reaction formula

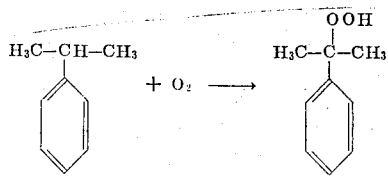

is subjected to an acid-catalyzed cleavage expressed by the following reaction formula.

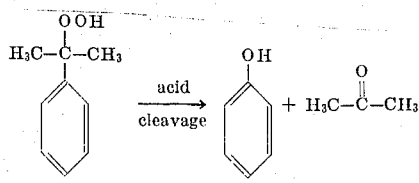

to thereby form phenol and acetone.

The above cleavage reaction is performed under such conditions that cumene hydroperoxide in the liquid oxidation product will be sufficiently cleaved to phenol and acetone. Generally, a concentrated hydroperoxide and an acid catalyst are continuously fed to a reactor in a manner such that they will be allowed to stay in the reactor for a certain period of time, and the reaction is performed until the hydroperoxide concentration in the effluent is not higher than 0.1 percent by weight or substantially zero. The effluent is then cooled and the acid is neutralized in a neutralization tank. Then the acetone is recovered and the residue is forwarded to the step of recovering phenol.

The above-mentioned acid-catalyzed cleavage method is, however, defective in that the phenol obtained by the acid-catalyzed cleavage of cumene hydroperoxide itself is colored and it frequently contains color formers or precursors that cause undesirable coloring when the phenol is combined with chlorine-containing materials. With a view to overcoming these defects of the acid-catalyzed cleavage method an improvement has been once proposed an improvement comprising maintaining in a primary cleavage zone the concentration of the acid catalyst at such levels as will maintain the ratio of acid to water in said primary cleavage zone at from about 0.01 to 0.25, conducting the primary cleavage while maintaining the cumene hydroperoxide concentration in the liquid cleavage mixture at 0.5 – 5.0 percent by weight, introducing the incompletely cleaved product into a secondary cleavage zone where it is held until the cumene hydroperoxide concentration has fallen to a low value, preferably below about 0.1 percent by weight, to thereby complete the cleavage, neutralizing the completely cleaved product with an alkali and thereafter recovering the intended products (specifications of U.S. Pat. No. 2,957,921 and British Patent No. 819,028).

Various proposals such as the above-described two-stage method have been made as improvements to the acid-catalyzed cleavage of cumene hydroperoxide and it is disclosed that some of these proposals may be applied to the acid-catalyzed cleavage of other α,α-dialkylarylmethyl hydroperoxides as well as the acid-catalyzed cleavage of cumene hydroperoxide.

The preparation of cresol and acetone by the acid-catalyzed cleavage of cymene hydroperoxide (isopropylmethylbenzene hydroperoxide) involves technical problems different from those encountered in the acid-catalyzed cleavage of cumene hydroperoxide and that industrially satisfactory results would not be obtained without solution of these technical problems.

In the conventional acid-catalyzed cleavage of cumene hydroperoxide, according to either the one-stage method or the improved two-stage method, the acid-catalyzed cleavage is allowed to advance to substantial completion before the reaction is stopped by neutralization of the acid catalyst. In view of the fundamental concept of the chemical reaction that the starting compound must be converted to the intended product in a highest yield possible, it is quite reasonable that the cleavage reaction is allowed to advance to substantial completion. However, it has been found that application of the above concept to the acid-catalyzed cleavage of cymene hydroperoxide results only in undesirable disadvantages.

More specifically, when the acid-catalyzed cleavage of a liquid oxidation product of cymene containing cymene hydroperoxide is effected so that cymene hydroperoxide in the oxidation product will be sufficiently cleaved, cresol is obtained only in a very low yield with formation of resinous by-products which contaminate the cresol and make separation and recovery of cresol complicated and difficult, with the result that complicated and disadvantageous process steps are required for purification of the product and the yield of the cresol product is considerably lowered by purification loss. When according to the above-mentioned improved two-stage method the acid-catalyzed cleavage of cymene hydroperoxide is performed by conducting a primary cleavage until the cymene hydroperoxide concentration in a concentrate of a liquid cleavage product of cymene is 0.5 – 5 percent by weight, introducing the incompletely cleaved product in a secondary cleavage zone where the cleavage is substantially completed, neutralizing the cleaved product with an alkali and recovering cresol and acetone from the neutralized product, results are as poor as in the one-staged method and in some runs the results are inferior to those obtained in the one-stage method.

The reason above-mentioned technical problems which were not encountered in the acid-catalyzed cleavage of cumene hydroperoxide is that the oxidation product of cymene expressed by the formula

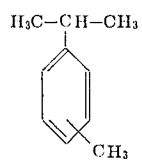

wherein the $CH_3$— substituent may be at any of ortho-, meta- and parapositions,
differs from an oxidation product of cumene in that the oxidation product of cymene contains, in addition to the $\alpha,\alpha$-dimethyltoluylmethyl hydroperoxide of the following formula (I) where the tertiary carbon atom has been oxidized, the isopropylbenzyl hydroperoxide of the following formula (II):

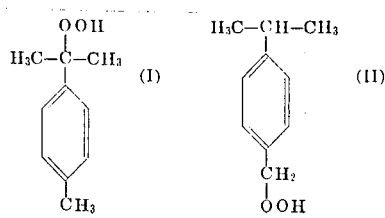

When according to the conventional technique the acid-catalyzed cleavage is carried out in a manner such that the cleavage of $\alpha,\alpha$-dimethyltoluylmethyl hydroperoxide will be substantially completed before the termination of the cleavage by neutralization of the acid catalyst, formaldehye is formed which appears to result from the acid-catalyzed cleavage of the compound of formula (II) and the acid catalyst present in the cleavage reaction system acts as a catalyst promoting the condensation between the formaldehyde and the cresol which is the cleavage product of the compound of formula (I). Thus the cresol is consumed by this condensation reaction, resulting in undesirable resinous products, and it is supposed that the above-mentioned problems would be encountered because of the above peculiar reaction mechanism. Based on these findings the above-mentioned problems can be solved by stopping the acid-catalyzed cleavage of a liquid oxidation product of cymene by alkali neutralization when the concentration of cymene hydroperoxide in the liquid is reduced to 0.5 – 5 percent by weight, without furthering the cleavage of the incompletely cleaved product, and subjecting the neutralized product to a thermal decomposition treatment at a temperature of 100° – 250° C.

Accordingly, the primary object of this invention is to provide a process for preparing cresol and acetone by the acid-catalyzed cleavage of cymene hydroperoxide with great industrial advantages which can overcome the above-mentioned technical problems encountered in the acid-catalyzed cleavage of cymene hydroperoxide.

Other objects and advantages of this invention will be apparent from the description given hereinbelow.

Methods for preparing cymene hydroperoxide by oxidation of cymene have been well known. The resulting oxidation product is a liquid containing usually about 10 – 15 percent by weight of hydroperoxides. In this invention, such reaction product is concentrated until the cymene hydroperoxide concentration reaches more than 50 percent by weight and usually, the concentrate containing 50 – 90 percent by weight of cymene hydroperoxide is used as starting material.

The starting liquid is subjected to an acid-catalyzed cleavage according to procedures known per se. In this invention, however, the cleavage is stopped when the concentration of cymene hydroperoxide is reduced to 0.5 – 5 percent by weight, preferably 0.5 – 3 percent by weight. In case the cleavage is preformed until the cymene hydroperoxide concentration is below 0.5 percent by weight or the cleavage is substantially completed as in the conventional methods until the concentration is below 0.1 percent by weight, the cleavage of isopropylbenzyl hydroperoxide of above formula (II) which is coexistent in the liquid is caused to occur abruptly and there is coincidentally caused a condensation between cresol formed by the cleavage of $\alpha,\alpha$-dimethyltoluyl hydroperoxide of above formula (I) and formaldehyde formed as by-product by the cleavage of isopropylbenzyl hydroperoxide of formula (II), with the result that the once formed intended cresol is consumed for this condensation reaction and undesirable resinous byproducts are formed. In case the cleavage is stopped when the concentration of cymene hydroperoxide is above 5 percent by weight, the conversion to intended cresol is so much reduced, resulting in industrial disadvantages. In order to prevent the consumption of once formed cresol caused by formation of formaldehyde to a highest degree possible and to cleave cymene hydroperoxide to intended cresol and acetone at a highest conversion possible, it is essential that the cleavage reaction is performed until the percentage of cymene hydroperoxide in the reaction liquid is 0.5 – 5 percent by weight, preferably 0.5 – 3 percent by weight.

It is preferable to conduct the above cleavage at a temperature ranging from 60° to 90°C. and it is particularly desired to maintain the cleavage temperature at about 80°C.

In the process of this invention, the incompletely cleaved product obtained by the above-mentioned cleavage reaction is neutralized with an alkali to stop the acid-catalyzed cleavage and is not further subjected to a secondary cleavage as in the above-mentioned two-stage method. Thus, the process of this invention does not require such complicated and troublesome two-stage controls as required in the conventional two-stage method.

Known acid catalysts such as mineral acids are used for performing the above-mentioned cleavage reaction, and use of sulfuric acid is particularly preferred. Known neutralizing agents such as sodium hydroxide, sodium carbonate, sodium phenolate and potassium hydroxide may be used as alkali for the above-mentioned neutralization.

In the oil phase of the resulting neutralized product there remain hydroperoxides containing 0.5 – 5 percent by weight of cymene hydroperoxide. If such neutralized product is forwarded to the step of recovering the intended products as it is, there is a danger of explosion. Accordingly, in the process of this invention the danger of explosion is avoided by removing the aqueous phase from the neutralized product and thermally decomposing the remaining oil phase at a temperature of 100° – 250°C. In this thermal decomposition step either the intended cresol or acetone is not decomposed at all and the danger of explosion can be avoided conveniently.

Usually, the incompletely cleaved product is cooled and neutralized to remove the acid catalyst and then subjected to a thermal decomposition treatment prior to the separation and recovery of acetone. In view of prevention of occurrence of the cleavage of the compound of formula (II), it is desired that the incompletely cleaved product resulting from the acid-catalyzed cleavage step is cooled and introduced to the neutralization step as promptly as possible.

The thermal decomposition treatment is effected at a temperature of 100° – 250°C., preferably 140° – 220°C. By this treatment $\alpha,\alpha$-dimethyltoluyl hydroperoxide and isopropylbenzyl hydroperoxide remaining in the neutralized product are decomposed. Isopropylbenzyl hydroperoxide is abruptly thermally decomposed at temperatures approximating 140°C. and converted to isopropylbenzyl alcohol and isopropylbenzaldehyde. Accordingly, the formation of formaldehyde as by-product can be prohibited by the decomposition of isopropylbenzyl hydroperoxide and occurrence of addition condensation of formaldehyde to cresol resulting from the cleavage reaction can be substantially prevented, with the consequence that the intended products can be recovered in high yields. Further, since the concentration of hydroperoxides in the reaction liquid resulting from the acid-catalyzed cleavage is sufficiently low, occurrence of a violent reaction can be prevented during the thermal decomposition treatment by selecting a suitable heating temperature. In conducting the thermal decomposition treatment it is preferable to add a small amount of a diluted aqueous solution of an alkali such as sodium hydroxide and alkali carbonate to the oil phase of the neutralized product, whereby small amounts of carboxylic acids formed by thermal decomposition of hydroperoxides are neutralized and occurrence of the acid-catalyzed cleavage can be completely prevented during the thermal decomposition treatment. Usually, such diluted aqueous solution of an alkali is added in an amount of 0.01 – 1.0 percent by weight based on the oil phase.

The thermal decomposition may be effected in various ways but in order to conduct the thermal decomposition most simply and safely, it is desired to adopt a system comprising two or more heat exchangers provided in parallel for gradually elevating the temperature of a heating medium, a tank provided at the outlet of the final heat exchanger and a valve provided for adjusting the reaction pressure. If the pressure of the reaction system exceeds the prescribed value, the pressure can be reduced easily and promptly by means of the pressure-adjusting valve. Thus, by employing the above-mentioned system the safety of operation can be further heightened.

The product resulting from the thermal decomposition step is then forwarded to the recovery step, and cresol and acetone are recovered therefrom in a customary manner.

One embodiment of the process of this invention will now be detailed by referring to the appended drawing.

In the drawing there is illustrated a flow sheet embodying the practice of the process of this invention.

A concentrated liquid containing cymene hydroperoxide is charged in a reactor I for the acid-catalyzed cleavage via introduction tube 1 and an acid catalyst, for instance, an aqueous solution of sulfuric acid, is introduced in reactor I through introduction tube 2.

Usually, the acid-catalyzed cleavage reaction is conducted while removing the reaction heat by refluxing acetone, and the reaction temperature is maintained at 60° – 90°C., preferably 75° – 85°C., for instance, at 80°C. by introducing a great amount of acetone together with sulfuric acid or by preventing the elevation of the reaction temperature by maintaining the whole reaction system at reduced pressure. The cleavage reaction is performed until the concentration of cymene hydroperoxide is 0.5 – 5 percent by weight, and the reaction liquid is passed through outlet tube 3 provided with liquid level adjuster 4 and cooled to room temperature by means of heat exchanger 5. Then it is introduced into tank II and then fed to a neutralization tank III through pump 6. An alkali such as sodium hydroxide solution is fed to the neutralization tank III through line 7 and the acid catalyst is neutralized. During the neutralization step, the alkali is supplied in an amount sufficient to maintain the pH of the aqueous phase in a subsequent decomposition tank IV at more than 7, preferably 8 – 12. Usually, the pH of the aqueous phase in the decomposition tank IV is maintained at about 8 – 10. In case the acid remains even after the neutralization step, good results cannot be expected because the acid-catalyzed cleavage is caused to occure coincidentally during the subsequent thermal decomposition step. As detailed hereinabove, in such case isopropylbenzyl hydroperoxide, which is a main component of the remaining hydroperoxides, is cleaved into isopropylphenol and formaldehyde, and formaldehyde is added to cresol and condensed therewith, resulting in lowering of the yield of cresol. In case the aqueous phase in the decomposition tank IV is kept alkaline or neutral, isopropylbenzyl hydroxide is converted to isopropylbenzyl alcohol and isopropylbenzaldehyde during the thermal decomposition treatment because the decomposition is mainly a radical decomposition, and no aldehyde is formed as by-product and any bad influence is given to the yield of cresol. The reaction product liquid from the tank III is introduced into the decomposition tank IV through line 8 and separated into aqueous and oil phases. The aqueous phase is removed from line 9 and the oil phase separated at the tank IV is introduced into a column V for separating acetone through pump 10 and heat exchangers 11. Heat exchangers 11 are successively heated by steam or the like. In the acetone-separating column V the acetone fraction is separated and recovered through column top line 12, and the cresol fraction is separated and recovered from column bottom line 13.

The process of this invention will now be detailed by referring to examples but this invention is not limited by these examples.

EXAMPLES 1 TO 3

A mixed cymene consisting of 3.5 percent of ortho-cymene, 64.0 percent of metacymene and 32.5 percent of para-cymene was oxidized with molecular oxygen-containing gas and the oxidation product was concentrated. The so obtained concentrate of the oxidation product of cymene containing 77.2 percent by weight of cymene hydroperoxide was subjected to an acid-catalyzed cleavage reaction by employing sulfuric acid as catalyst. The acid-catalyzed cleavage reaction was carried out continuously by employing a reactor of a complete mixing tank type provided with a reflux condenser and a stirrer where the reaction mixture was passed through a liquid level adjuster from the bottom of the reactor, cooled by the condenser and introduced in a storage tank. The reaction was effected at 80°C. under atmospheric pressure for an average residence time of 12 minutes under reflux of acetone while introducing acetone in an amount equimolar to cymene hydroperoxide. Thus there was obtained an incompletely cleaved product in which the sulfuric acid concentration was 0.22 percent by weight, the water content was 1.75 percent by weight and the concentration of the remaining cymene hydroperoxide was 1.42 percent by weight. The incompletely cleaved product was treated with sodium hydroxide to neutralize sulfuric acid contained in said product until the pH of the aqueous phase was 7, followed by separation of the aqueous phase. Then the oil phase was subjected to a thermal decomposition treatment to decompose cymene hydroperoxide remaining therein.

The thermal decomposition was effected with use of three heat exchangers connected in parallel, which were heated at 140°C., 180°C. and 223°C., respectively in order and each of which had the same capacity so that the residence time in each heat exchanger would be the same. A tank was provided at the outlet of the final heat exchanger. The thermally decomposed product was withdrawn from the bottom of the tank through a liquid level adjuster and fed to the bottom of an acetone-separating column. The thermal decomposition was conducted three times by varying the residence time as 1 minute, 2 minutes and 3 minutes. In each run the concentration of the remaining cymene hydroperoxide at the outlet of the final heat exchanger was below 0.01 percent. Results are shown in Table 1.

In Table 1 there are also shown results of runs where the thermal decomposition was conducted after a 5 percent aqueous solution of sodium hydroxide or sodium carbonate had been added in an amount of 0.01 percent to the oil phase of the neutralized product so as to neutralize a small amount of carboxylic acids to be formed by the thermal decomposition of hydroperoxides and to thereby prevent coincidental occurrence of the acid-catalyzed cleavage during the thermal decomposition (Examples 2 and 3). Results shown in Table 1 are those obtained by conducting the thermal decomposition by adjusting the average residence time in each heat exchanger to 1 minute.

TABLE 1

| Example No. | Yield of cresol (mole %) | Yield of isopropyl phenol (mole %) |
|---|---|---|
| 1 (heat treatment alone) | 78.7 | 6.3 |
| 2 (heat treatment with addition of sodium carbonate) | 79.0 | 6.3 |
| 3 (heat treatment with addition of sodium hydroxide) | 78.7 | 6.3 |

COMPARATIVE EXAMPLE 1

The acid-catalyzed cleavage was carried out in the same manner as in Example 1 except that the average residence time was changed to 60 minutes so that the concentration of cymene hydroperoxide at the end of the cleavage reaction might be below 0.5 percent by weight. In the resulting cleaved product, the sulfuric acid concentration was 0.40 percent by weight, the water content was 2.0 percent by weight and the cymene hydroperoxide concentration was 0.28 percent by weight. This reaction mixture was subjected to neutralization and thermal decomposition treatments in the same manner as in Example 1. The yield of cresol was 71.0 mole percent and that of isopropyl phenol was 9.0 mole percent. Considerable amounts of resinous products were coincidentally formed.

EXAMPLE 4

The acid-catalyzed cleavage reaction was carried out in the same manner as in Example 1 except that the average residence time was changed to 34 minutes. In the resulting cleaved product, the sulfuric acid concentration was 0.30 percent by weight, the water content was 1.75 percent by weight and the cymene hydroperoxide concentration was 0.83 percent by weight. This reaction mixture was subjected to neutralization and thermal decomposition treatments in the same manner as in Example 1. The yield of cresol was 78.0 mole percent and that of isopropyl phenol was 7.5 mole percent.

EXAMPLE 5

The acid-catalyzed cleavage reaction was carried out in accordance with Example 1 until the cymene hydroperoxide concentration was 4.0 percent by weight. The resulting incompletely cleaved product was subjected to neutralization and thermal decomposition treatments in the same manner as in Example 1. The yield of cresol was 76.8 mole percent and that of isopropyl phenol was 1.6 mole percent.

COMPARATIVE EXAMPLE 2

The acid-catalyzed cleavage reaction was carried out in the same manner as in Example 1 until the cymene hydroperoxide concentration was 1.42 percent by weight. Then, the resulting incompletely cleaved product was introduced into a separately provided secondary zone where the product was allowed to stay under cleaving conditions until the cymene hydroperoxide concentration was reduced to 0.1 percent by weight. The resulting cleaved product was subjected to neutralization and thermal decomposition treatments in the same manner as in Example 1. The yield of cresol was 67 mole percent, and formation of resinous products was observed as in Comparative Example 1.

COMPARATIVE EXAMPLE 3

The acid-catalyzed cleavage reaction was carried out in the same manner as in Example 1 until the cymene hydroperoxide concentration was 6 percent by weight. The resulting incompletely cleaved product was subjected to neutralization and thermal decomposition treatments in the same manner as in Example 1. The yield of cresol was 68.3 mole percent.

What we claim is:

1. In a process for the preparation of cresol and acetone comprising subjecting cymene hydroperoxides to an acid-catalyzed cleavage to form cleaved products, neutralizing said cleaved products to form neutralized products and recovering cresol and acetone from said neutralized products, the improvement which comprises subjecting a liquid oxidation product of cymene containing at least 50 percent by weight of cymene hydroperoxide to an acid-catalyzed cleavage at a temperature of 60° – 90°C. until the concentration of cymene hydroperoxide in said liquid is 0.5 – 5 percent by weight to form an incompletely cleaved product, neutralizing said incompletely cleaved product with an alkali to stop the acid-catalyzed cleavage to form an aqueous phase and an oil phase, thermally decomposing the hydroperoxide remaining in said oil phase at a temperature of 100° – 250°C. to form a thermal decomposition product and recovering cresol and acetone from said thermal decomposition product.

2. The process as described in claim 1 wherein said starting liquid oxidation product of cymene contains 50 – 90 percent by weight of cymene hydroperoxide.

3. The process as described in claim 1 wherein said acid-catalyzed cleavage is effected until the concentration of cymene hydroperoxide in said liquid is 0.5 – 3 percent by weight.

4. The process as described in claim 1 wherein said neutralization is effected so that the pH of said aqueous phase is maintained at 7 – 12.

5. The process as described in claim 4 wherein the said pH is maintained at 8 – 10.

6. The process as described in claim 1 wherein said thermal decomposition is effected in a plurality of stages and the temperature is elevated in each successive stage above the temperature in the preceding stage.

7. The process as described in claim 1 wherein said thermal decomposition is effected after a small amount of a diluted aqueous solution of an alkali has been added to said oil phase.

8. The process as described in claim 1 wherein said decomposition is effected at a temperature ranging from 140° to 220°C.

* * * * *